(12) United States Patent
Brocco et al.

(10) Patent No.: US 8,639,897 B1
(45) Date of Patent: Jan. 28, 2014

(54) METHOD TO RESTORE APPLICATION SPECIFIC CONTENT FROM VOLUME IMAGES

(75) Inventors: Matthew W. Brocco, DeBary, FL (US); Kirk L. Searls, Maitland, FL (US); Steven R. DeVos, Kirkland, WA (US)

(73) Assignee: Symantec Operating Corporation, Mountain View, CA (US)

( * ) Notice: Subject to any disclaimer, the term of this patent is extended or adjusted under 35 U.S.C. 154(b) by 790 days.

(21) Appl. No.: 11/967,667

(22) Filed: Dec. 31, 2007

(51) Int. Cl.
*G06F 11/14* (2006.01)
*G06F 12/16* (2006.01)

(52) U.S. Cl.
CPC .................... *G06F 11/1469* (2013.01)
USPC .................... 711/162; 711/E12.103

(58) Field of Classification Search
None
See application file for complete search history.

(56) References Cited

U.S. PATENT DOCUMENTS

| | | | | |
|---|---|---|---|---|
| 6,047,294 A * | 4/2000 | Deshayes et al. | | 1/1 |
| 6,141,773 A * | 10/2000 | St. Pierre et al. | | 714/20 |
| 6,279,011 B1 * | 8/2001 | Muhlestein | | 711/162 |
| 6,415,300 B1 * | 7/2002 | Liu | | 1/1 |
| 6,938,180 B1 * | 8/2005 | Dysert et al. | | 714/6 |
| 7,024,581 B1 * | 4/2006 | Wang et al. | | 714/2 |
| 7,555,620 B1 * | 6/2009 | Manley | | 711/162 |
| 7,577,808 B1 * | 8/2009 | Kushwah | | 711/162 |
| 7,660,956 B1 * | 2/2010 | Nadathur et al. | | 711/162 |
| 8,209,290 B1 * | 6/2012 | Dowers et al. | | 707/640 |
| 8,489,552 B1 * | 7/2013 | Dowers et al. | | 707/640 |
| 2008/0243949 A1 * | 10/2008 | Anguelov | | 707/204 |
| 2010/0077160 A1 * | 3/2010 | Liu et al. | | 711/162 |

OTHER PUBLICATIONS

Veritas Architect Network. "DAR (Direct Access Recovery)—A Look Under the Covers." Apr. 2003. Veritas.*

* cited by examiner

*Primary Examiner* — Nathan Sadler
(74) *Attorney, Agent, or Firm* — Campbell Stephenson LLP

(57) ABSTRACT

A method, computer readable medium, and apparatus for creating and using backups which allow restoration of applications and/or specific content using volume image backup files. A directory of applications and application specific content is created which, along with metadata associated therewith, allows selection and restoration of such content using data stored in a volume image backup file, thereby reducing the time needed to create backups which are restorable at the application level.

20 Claims, 5 Drawing Sheets

METHOD TO RESTORE APPLICATION SPECIFIC CONTENT FROM VOLUME IMAGES

FIELD OF THE INVENTION

This invention relates to data storage and, more particular, to performing backups and recoveries of stored data.

BACKGROUND OF THE INVENTION

Data objects (e.g., databases, file directories, files within directories, email exchange mailboxes, etc.) are typically stored on a volume. While it is said that a volume stores data objects, in reality the data objects are stored on memory devices, such as hard disks, allocated to the volume. But hard disks fail at the worst times and take all the data objects stored on them with them when they go. This problem motivated the creation of backup systems. There is continuous and growing demand for backup systems which are faster, more efficient, more economical, and more powerful than those before.

Two commonly used ways to backup data are volume level backups and application level backups. Each mode has its advantages and drawbacks. Volume level backups are block-by-block copies of an entire volume. Such block-by-block copying may be done relatively quickly, providing the advantage of using relatively few computer resources, such as processing power. However, volume level backups do not allow a user to restore a single application or content specific to an application. On the other hand, application level backups do allow a user to restore an application or content specific to an application, which is advantageous for a user who does not wish to restore an entire volume. However, application level backups are relatively slow and have the disadvantage of imposing a relatively high burden on computer resources.

Application level restores require application specific metadata. For instance, to restore an application, it is necessary to know what files the application uses. This is just one example, various other application specific metadata is also required or used, such as the application name, application run time, and so on. When an application level backup is performed, as described above, this metadata is collected and copied. The application level backup proceeds by opening each file, then storing the file contents to backup. The files used by an application are generally stored on one or more volumes. The present invention is described with reference to the files being stored on a single volume, it being understood the present invention should not be limited thereto. Application specific metadata can be collected during this backup process. This metadata may be stored apart from the files, for instance on another server. As mentioned above, application level backups are generally slow and impose a high burden on computer resources. However, the application specific metadata gathered during this process may be used to restore an application in its entirety, or specific content within an application. For example, Microsoft Exchange™ is organized into mailboxes. If a user wishes to specify one or more mailboxes to restore, application specific metadata is used.

On the other hand, performing a volume level (block by block) backup is, as noted above, much faster than performing an application level backup of all applications which have access to a given volume. A volume level backup copy process produces a volume image backup file, which contains an exact replica of the volume backed up. However, application specific metadata is not collected, so it is impossible to restore an application, or specific content within an application, from a volume image backup copy without restoring the entire volume.

What is needed is a way to allow users to take advantage of the relative speed of volume level backups, without having to sacrifice the ability to perform application level restores.

SUMMARY OF THE INVENTION

In one embodiment, a volume is selected to be backed up. The volume is backed up using a high speed volume level backup process, resulting in a volume image backup file. While the volume image is being created, a list of all applications with access to the volume and all the files used by each application is generated. Application specific metadata (as discussed above) is also collected. The list and the application specific metadata are used to create a directory of restorable objects. The directory and the volume image backup file are copied to backup storage.

When a user wishes to restore an application or specific content from within the application, the user may browse the directory and select an object to restore. When an object is restored, both application specific metadata for that object, and data from the volume image backup file are copied to the restore target location in the volume.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
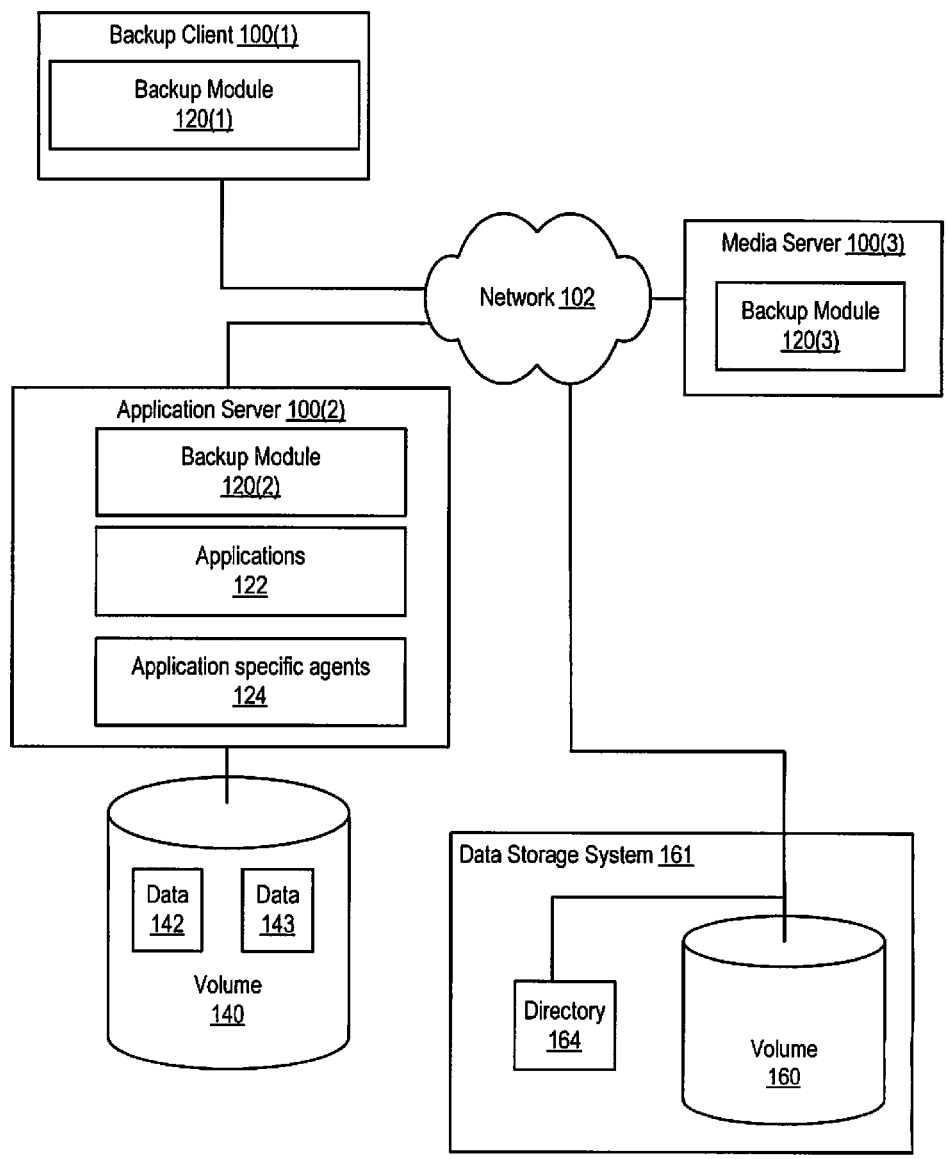
FIG. 1 is a block diagram of a data storage system.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a data processing system. The components in FIG. 1 can perform backups, full restores from backups, selective restores of individual backed up applications, and/or selective restores of specific content within backed up applications. FIG. 1 includes a backup client 100(1), application server 100(2), and media server 100(3). Backup client 100(1), application server 100(2), and media server 100(3) respectively include backup modules 120(1), 120(2), and 120(3). In one embodiment, backup modules 120(1)-120(3) are implemented using VERITAS BackupExec™ software, available from Symantec Corporation of Cupertino, Calif.

Backup client 100(1), application server 100(2), and media server 100(3) are coupled by a network 102. Network 102 can include a WAN (Wide Area Network), such as the Internet, one or more LANs (Local Area Networks), and/or one or more SANs (Storage Area Networks). Network 102 can be implemented using various media, including coaxial cables, fiber optic cables, and wireless links.

Application server 100(2) is a computing device that is coupled to volume 140. Volume 140 is a physical or logical storage device that stores data 142 and 143. Volume 140 can include one or more physical storage devices (e.g., in one embodiment, volume 140 is implemented on a storage array that includes several independent hard drives). First and second applications of applications 122, which are executing on application server 100(2) can access (e.g., read and write) data 142 and 143, respectively, stored on volume 140. Application server 100(2) may also contain an agent specific to each application executing on application server. Application specific agents 124 are configured to monitor and/or control respective applications 122.

As shown, backup client 100(1), application server 100(2), and media server 100(3) each include backup and restore client software or agents implemented by backup modules 120(1)-120(3). Together, the backup and restore agents can backup and restore information stored on volume 140.

Backup client 100(1) includes backup module 120(1), which initiates backups of client data on volume 140. For example, backup module 120(1) can include a user interface that allows a user to specify when data should be backed up. A one time backup operation may be specified, or backups may be scheduled to automatically occur on a periodic basis. Backup module 120(1) can also operate to control media server 100(3) and to interact with application server 100(2).

Media server 100(3) implements backup module 120(3), which performs backup and restore operations under direction from backup client 100(1). Volume 160 is accessible to media server 100(3) and may be implemented on storage system 161, which may contain random access media such as hard disk drives, optical disks (e.g., CDs (Compact Discs) and DVDs (Digital Versatile Discs), and the like).

Application server 100(2) implements backup module 120 (2). Backup module 120(2) can communicate with application specific agents 124. Together, backup module 120(2) and application specific agents 124 can create directories which may be used to restore data that is backed up from volume 140 to volume 160. Creation and use of these directories are more fully described below.

Figure 2:
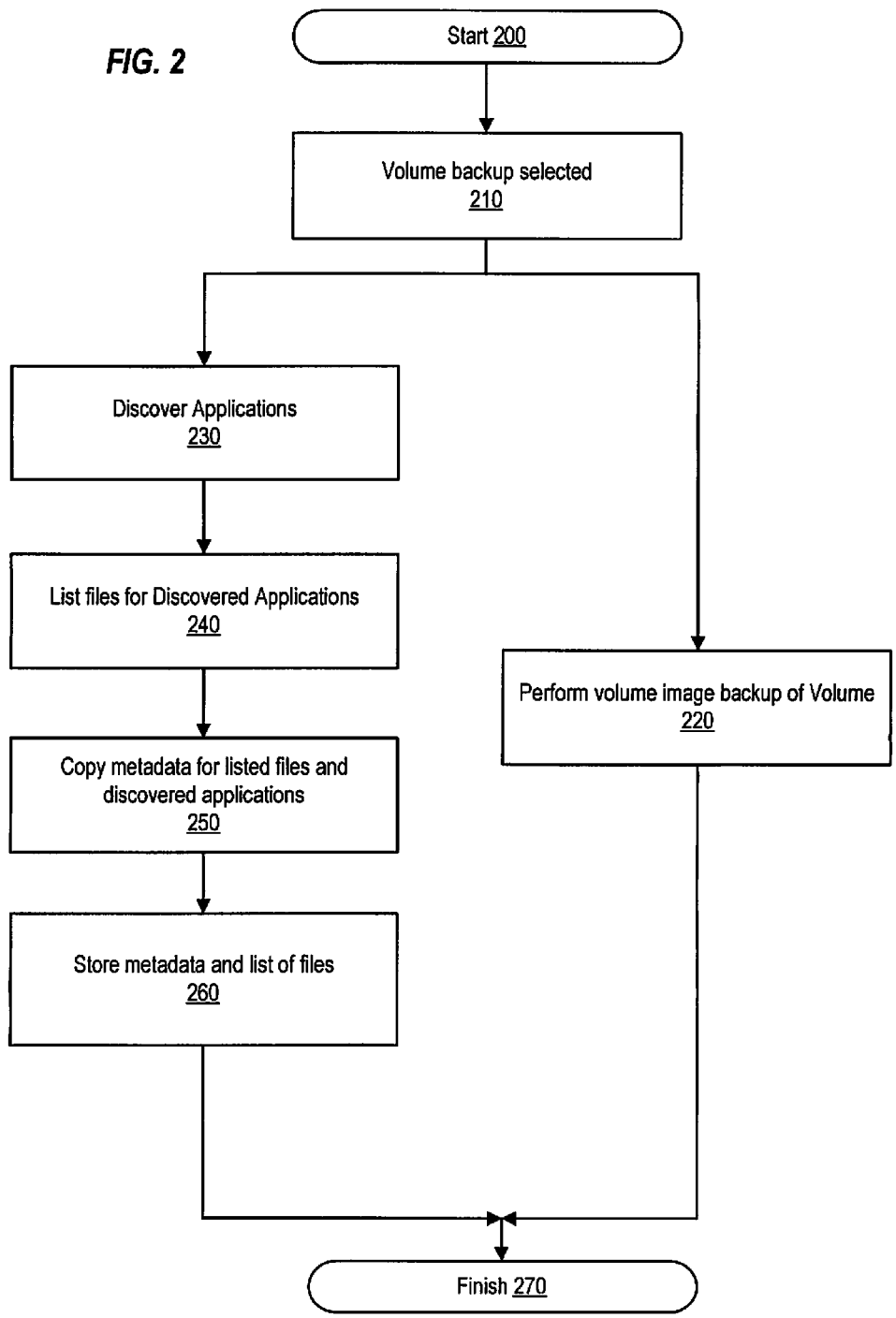
FIG. 2 is flowchart of a method of creating a backup.

FIG. 2 illustrates a method of creating a backup, according to one embodiment. The method begins at 200. At 210, a volume backup is requested. Requesting a volume backup may involve using software such as VERITAS BackupExec™. Such software can be run on backup client 100(1) and can present a list of volumes which may be selected for backup. A user of backup client 100(1) can select one or more of the volumes to be backed up. The present invention will be described with reference to backing up a single volume (e.g. volume 140) it being understood that the present invention should not be limited thereto.

Once a volume is selected for backup, backup module 120(1) sends a backup request to backup module 120(2). Backup module 120(2) orders a volume image backup copy of the selected volume to be created at step 220. The volume image copy is produced using a high speed copy process which copies the entire contents of the selected volume. Generally a block by block copy is performed, resulting in an exact replica of the volume being backed up. For example, volume 140 may be selected for backup. Each block contained in volume 140 would be sequentially copied to volume 160.

Backup module 120(2) can also communicate with application specific agents 124 which reside on application server 100(2). For each distinct application running on application server 100(2), there is a respective application specific agent 124. The application specific agents 124 are responsible for monitoring and controlling the applications with which they are associated.

At 230, at substantially the same time the volume image copy is being created, backup module 120(2) detects each application running on application server 100(2) that has access to data on volume 140. At 240, backup module 120(2) contacts the application specific agent 124 for each application discovered and requests that the agent create a list of all files the application 122 uses. Each agent 124 knows which files application 122 is using and provides backup module 100(2) with a list of those files.

Backup module 120(2), at 250, makes a copy of each list of files received from application specific agents 124. Backup module 120(2) also copies metadata for the files in the list and metadata for the applications 122. Backup module 120(2) writes metadata and list in, for example, data storage system 161. The metadata and list are stored and used to create directory 164, described in greater detail in conjunction with FIG. 4. Together, the metadata and the list of files used by each application will allow the restoration of application specific content from a volume image backup.

The method of FIG. 2 ends at 270. It is noted that at least some of the functions 210, 220, 230, 240, 250, and 260 depicted in FIG. 2 can be performed in a different order in other embodiments, and that some embodiments may include other functions instead of and/or in addition to those functions illustrated in FIG. 2.

Figure 3:
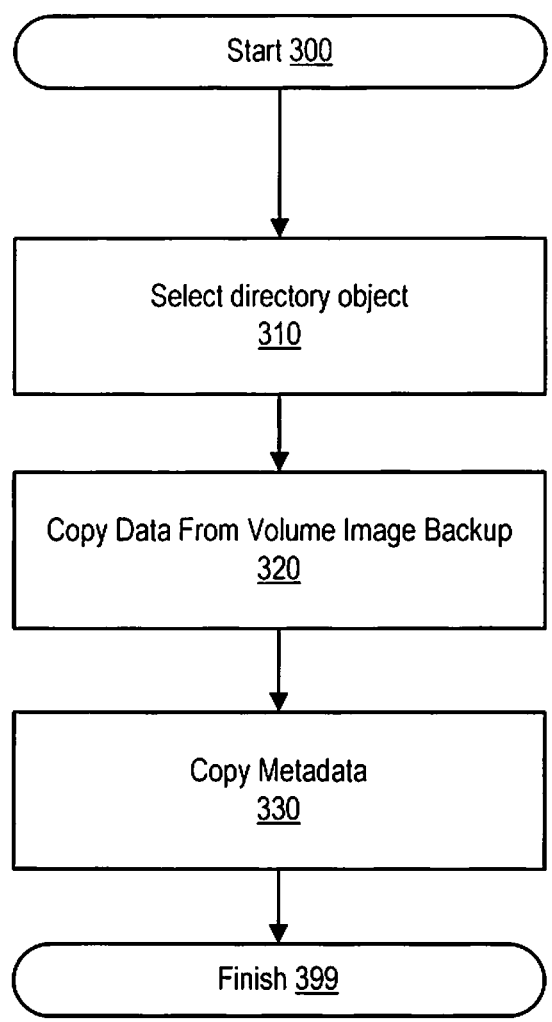
FIG. 3 is a flowchart of a method of restoring data.

FIG. 3 illustrates a method of restoring from a backup, according to one embodiment. The method begins at 300. At 310, a user viewing the directory can navigate the list and select an object to restore. Backup module 120(1) can provide a user with access to a directory 164. Backup client 100(1) provides a user interface. Through the user interface, a user can browse the contents directory 164. Directory 164 displays a hierarchical list of objects that can be restored. For instance, each application which was running on the volume at backup time is an object which may be selected for restore. Specific content from within an application to restore may also be selected for restore.

For example, if, while Microsoft Exchange™ was running on application server 100(2) and had access to volume 140, volume 140 was selected for a volume image backup copy operation, directory 164 would contain information allowing a user to select Exchange as a restorable object. If the user instead wished to restore only a specific user group, or a specific mailbox, the hierarchical listing is navigable from the volume level, down to the application level, down to the level of a specific email message. The objects at each level may be selected for restore. The list can include applications or specific content within applications.

Once an object has been selected to restore, backup module 120(1) communicates to backup module 120(3) what was selected. Media server 100(3) then restores, at 320, the selected object to application server 100(2). Restoration of a selected object includes not only copying the data the object needs, for example file data stored in volume image file 162, but also copying metadata, at 330, associated with the object and application specific metadata. The method ends at 399.

Figures 4A, 4B:
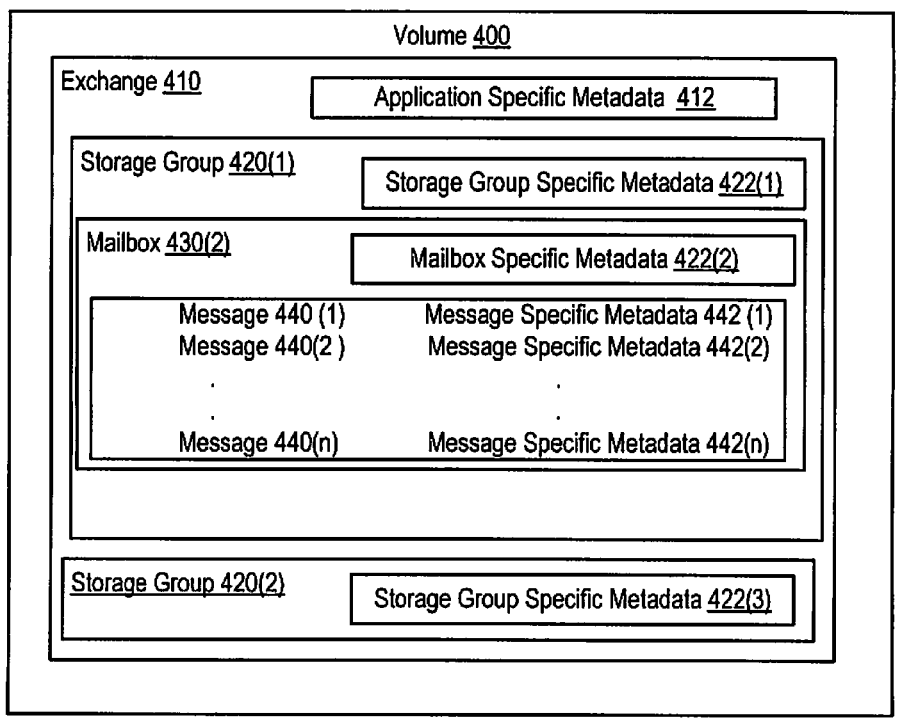
FIG. 4A is an exemplary directory.
FIG. 4B is a block diagram of an exemplary directory.

FIG. 4A is a diagram of an exemplary directory 164 according to one embodiment, which contains a listing of restorable objects. The directory presents a hierarchical list of object descriptor blocks. The object descriptor blocks are selectable and expandable. The directory may be browsed by selecting an object descriptor block, for instance object descriptor block 400. Selection of object descriptor block 400 causes the object descriptor blocks at the next level down to be displayed. Object descriptor block 410 is one level below object descriptor block 400, and 420(1) and 420(2) are one level below 410. One level below 420 is object descriptor block 430 and one level further down there are several object descriptor blocks 440(1) through 440(n). Any of these object descriptor blocks represents an object which may be selected and restored. As discussed above, user can browse the directory and select an object descriptor block via a user interface, for example, presented by backup software running on backup client 100(1)

As an example, FIG. 4B shows a block diagram of an exemplary directory according to one embodiment. At the highest level, the directory contains an entry for Volume 400. Volume 400 was backed up as described above. At the time volume 400 was backed up, application 410 (which includes application specific metadata 412) had data access to volume 400. In this example, application 410 is comprised of storage groups 420(1) and 420(2) (which include storage group specific metadata 422(1) and 422(3), respectively). Storage group 420(1) is expandable to show mailbox 430(2). Mailbox 430(2) (which included mailbox specific metadata 422(2)) is further expandable to show individual messages 440, which include messages 440(1) through 440(n) and associated message specific metadata 442(1) through 442(n). Any of these various exemplary object descriptor blocks could be selected to be restored. For instance, a user could select message 440(2) to be restored. In that case, the data and metadata that make up message 440(2) (respectively stored in volume image file 162 and directory 164, for example) would then be copied out by backup module 120(3) and transferred by media server 100(3) to application server 100(2). As another example, a user could select Application 410 to be restored. Selecting Application 410 to be restored would also select each object descriptor block at a lower level to be selected. All data and metadata associated with the selected objects would then be restored, as discussed above.

The embodiment shown in FIG. 4 is exemplary only. Various embodiments may have more or fewer levels and more or fewer object descriptor blocks listed at each level.

Figure 5:
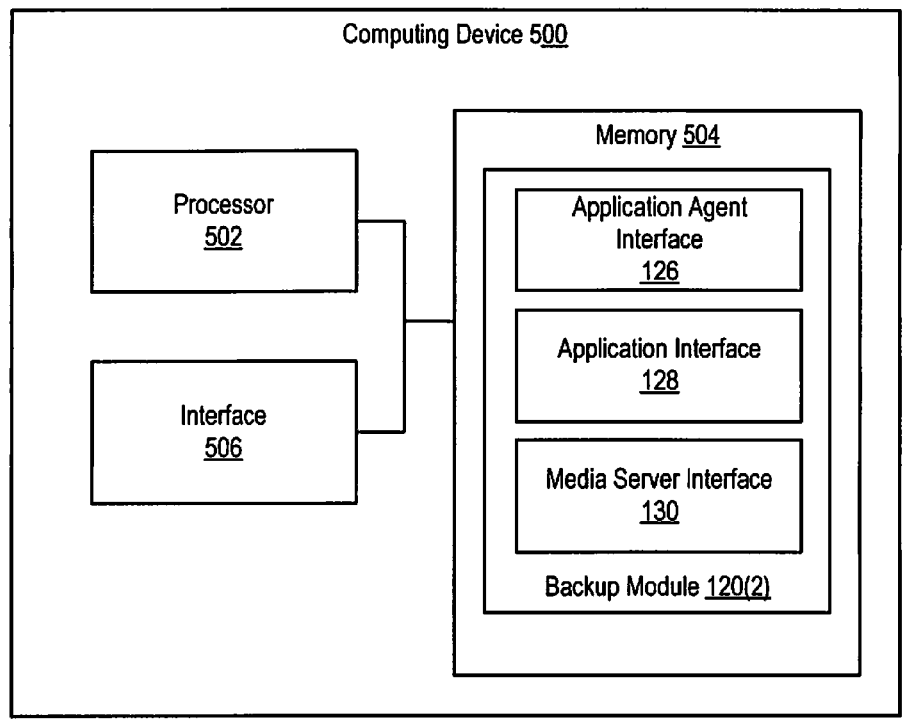
FIG. 5 is a block diagram of a computing system.

FIG. 5 is a block diagram of a computing device 500 that implements a backup module 120(2). FIG. 5 illustrates how backup module 120(2) can be implemented in software.

As illustrated, computing device 500 includes one or more processors 502 (e.g., microprocessors, PLDs (Programmable Logic Devices), or ASICs (Application Specific Integrated Circuits)) configured to execute program instructions stored in memory 504. Memory 504 can include various types of RAM (Random Access Memory), ROM (Read Only Memory), Flash memory, MEMS (Micro Electro-Mechanical Systems) memory, and the like. Computing device 500 also includes one or more interfaces 506. Processor 502, memory 504, and interface 506 are coupled to send and receive data and control signals by a bus or other interconnect.

Interface(s) 506 can include an interface to a storage device. Interface(s) 506 can also include an interface to a network (e.g., network 102 of FIG. 1) for use in communicating with a backup client or media server (e.g., if a distributed system, as shown in FIG. 1, is being implemented).

The program instructions and data implementing backup module 120(2) can be stored on various computer readable media such as memory 504. In some embodiments, such software is stored on a computer readable medium such as a CD (Compact Disc), DVD (Digital Versatile Disc), hard disk, optical disk, tape device, floppy disk, and the like). In order be executed by processor 502, the instructions and data implementing backup module 120(1) are loaded into memory 504 from the other computer readable medium. The instructions and/or data can also be transferred to computing device 500 for storage in memory 504 via a network such as the Internet or upon a carrier medium. In some embodiments, a computer readable medium is a carrier medium such as a network and/or a wireless link upon which signals such as electrical, electromagnetic, or digital signals, on which the data and instructions implementing backup module 120(2) are encoded, are conveyed.

Although the present invention has been described with respect to specific embodiments thereof, various changes and modifications may be suggested to one skilled in the art. It is intended that such changes and modifications fall within the scope of the appended claims.

What is claimed is:

1. A method comprising:
   selecting an object descriptor block from a directory, wherein
   the directory was created prior to receiving a restore request,
   the object descriptor block represents an object,
   the directory comprises a plurality of object descriptor blocks,
   each of the plurality of object descriptor blocks identifies data associated with an application,
   the application is implemented using an application server,
   each of the plurality of object descriptor blocks identifies metadata,
   at least a portion of the object is stored in a volume image backup,
   the volume image backup is created by a block-by-block copy process, and
   at least a portion of the metadata is stored in the directory; and
   selectively restoring first data from the volume image backup in response to the restore request, wherein
   the restoring consists of copying the first data from the volume image backup to the application server, and
   the first data consists of the object, and first metadata associated with the selected object descriptor block.

2. The method of claim 1 further comprising:
   receiving a request to create the volume image backup, wherein
   creating the volume image backup is performed in response to the request to create the volume image backup.

3. The method of claim 2 further comprising:
   creating the directory in response to the request to create the volume image backup, wherein creating the directory is performed substantially simultaneously with the creating the volume image backup and comprises:
   discovering a discovered application running on the volume;
   creating a list of all files used by the discovered application; and copying the list of files, metadata associated with the discovered application, and metadata associated with each listed file.

4. The method of claim 1, wherein the selected object descriptor block identifies the application.

5. The method of claim 1, wherein at least a portion of the first metadata is application specific metadata.

6. The method of claim 1 further comprising using the copied data and first metadata to restore at least a portion of a primary volume.

7. The method of claim 1 wherein the directory comprises a browsable, expandable, hierarchical list of object descriptor blocks.

8. A non-transitory computer readable storage medium comprising:
   a first set of instructions, executable by a processor, configured to select an object descriptor block from a directory, wherein
      the directory was created prior to receiving a restore request,
      the object descriptor block represents an object,
      the directory comprises a plurality of object descriptor blocks,
      each of the plurality of object descriptor blocks identifies data associated with an application,
      the application is implemented using an application server,
      each of the plurality of object descriptor blocks identifies metadata,
      at least a portion of the object is stored in a volume image backup,
      the volume image backup is created by a block-by-block copy process, and
      at least a portion of the metadata is stored in the directory; and
   a second set of instructions, executable by the processor, configured to perform a restore operation that selectively restores first data from the volume image backup in response to the restore request, wherein
      the restore operation consists of copying the first data from the volume image backup to the application server, and
      the first data consists of the object and first metadata associated with the selected object descriptor block.

9. The non-transitory computer readable storage medium of claim 8 further comprising:
   a third set of instructions, executable by the processor, configured to receive a request to create the volume image backup and create the volume image backup in response to the request to create the volume image backup.

10. The non-transitory computer readable storage medium of claim 9 further comprising:
   a fourth set of instructions, executable by the processor, configured to create the directory in response to the request to create the volume image backup, wherein creating the directory is performed substantially simultaneously with creating the volume image backup and comprises:
      discovering a discovered application running on the volume;
      creating a list of all files used by the discovered application; and
      copying the list of files, metadata associated with the discovered application, and metadata associated with each listed file.

11. The non-transitory computer readable storage medium of claim 8, wherein the object descriptor block identifies the application.

12. The non-transitory computer readable storage medium of claim 8, wherein at least a portion of the metadata is application specific metadata.

13. The non-transitory computer readable storage medium of claim 8 further comprising:
   a fifth set of instructions, executable by the processor, configured to use the copied data and metadata to restore at least a portion of a primary volume.

14. The non-transitory computer readable storage medium of claim 8 wherein the directory comprises a browsable, expandable, hierarchical list of object descriptor blocks.

15. An apparatus comprising:
   one or more processors;
   memory coupled to the one or more processors wherein the memory stores program instructions executable by the one or more processors to:
   select an object descriptor block from a directory, wherein
      the directory was created prior to receiving a restore request,
      the object descriptor block represents an object,
      the directory comprises a plurality of object descriptor blocks,
      each of the plurality of object descriptor blocks identifies data associated with an application,
      the application is implemented using an application server,
      each of the plurality of object descriptor blocks identifies metadata,
      at least a portion of the object is stored in a volume image backup,
      the volume image backup is created by a block-by-block copy process, and
      at least a portion of the metadata is stored in the directory; and
   selectively restore first data from the volume image backup in response to the restore request, wherein
      the restore operation consists of copying the first data from the volume image backup to the application server, and
      the first data consists of the object and first metadata associated with the selected object descriptor block.

16. The apparatus of claim 15 wherein the program instructions are further executable to:
   receive a request to create the volume image backup, wherein
   create the volume image backup in response to the request to create the volume image backup.

17. The method of claim 16 wherein the program instructions are further executable to:
   create the directory in response to the request to create the volume image backup, wherein creating the directory is performed substantially simultaneously with the creating the volume image backup and comprises:
      discovering a discovered application running on the volume;
      creating a list of all files used by the discovered application; and
      copying the list of files, metadata associated with the discovered application, and metadata associated with each listed file.

18. The apparatus claim 15, wherein the object descriptor block identifies the application.

19. The apparatus of claim 15, wherein at least a portion of the metadata is application specific metadata.

20. The apparatus of claim 15 wherein the program instructions are further executable to:

use the data and metadata to restore at least a portion of a primary volume.

* * * * *